United States Patent
Lujano et al.

(10) Patent No.: US 6,299,855 B1
(45) Date of Patent: *Oct. 9, 2001

(54) STABLE SYNTHETIC MATERIAL AND METHOD FOR PREPARING SAME

(75) Inventors: Juan Lujano, Caracas; Jose Carrazza, San Antonio; Norma Valencia de Zapata, Caracas, all of (VE)

(73) Assignee: Intevep, S.A., Caracas (VE)

(*) Notice: Subject to any disclaimer, the term of this patent is extended or adjusted under 35 U.S.C. 154(b) by 0 days.

This patent is subject to a terminal disclaimer.

(21) Appl. No.: 09/363,173

(22) Filed: Jul. 29, 1999

Related U.S. Application Data

(60) Division of application No. 09/024,069, filed on Feb. 17, 1998, now Pat. No. 6,106,802, which is a continuation-in-part of application No. 08/794,204, filed on Jan. 31, 1997, now Pat. No. 5,840,271.

(51) Int. Cl.[7] ............................ C01B 33/12; C01B 33/26; C01B 37/00
(52) U.S. Cl. ...................... 423/702; 423/705; 423/713; 423/328.1; 423/335; 502/65; 502/66; 502/73; 502/74
(58) Field of Search ........................ 423/702, 705, 423/713, 328.1, 600, 628, 335, 328.2; 502/65, 66, 73, 74, 235, 236, 241, 242, 243, 246, 250, 254, 258, 263

(56) References Cited

U.S. PATENT DOCUMENTS

| | | | |
|---|---|---|---|
| 5,143,879 | * | 9/1992 | Whitehurst .............................. 502/85 |
| 5,156,829 | * | 10/1992 | McCullen et al. .................... 423/718 |
| 5,238,676 | * | 8/1993 | Roth et al. ............................. 423/713 |
| 5,260,501 | * | 11/1993 | Bhore et al. . |
| 5,593,655 | * | 1/1997 | Jongkind et al. ..................... 423/702 |
| 5,622,684 | * | 4/1997 | Pinnavaia et al. ..................... 423/702 |
| 5,840,271 | * | 11/1998 | Carrazza et al. ..................... 423/700 |
| 5,863,515 | * | 1/1999 | Davis et al. .......................... 423/628 |

FOREIGN PATENT DOCUMENTS 670 286 * 9/1995 (EP) .

OTHER PUBLICATIONS

Mokaya et al., "Post–Synthesis Grafting of Al onto MCM–41," Chem. Commun., p. 2185–86, 1997.*

Hamden et al., "Alumination of the Purely Siliceous Mesoporous Molecular Sieve MCM–41 and its Hydrothermal Conversion into Zeolite Na–A," J. Chem. Soc., Faraday Trans., vol. 92(12), 2311–15, 1996.*

Bagshaw et al., "Templating of Mesoporous Molecular Sieves by Nonionic Polyethylene Oxide Surfactants," Science, vol. 269, pp. 1242–44, Sep. 1995.*

* cited by examiner

*Primary Examiner*—David Sample
(74) *Attorney, Agent, or Firm*—Bachman & LaPointe, P.C.

(57) ABSTRACT

A composition of matter is provided including an inorganic porous material having wall portions defining mesopore-sized channels having a mean diameter of between about 15 Å and about 100 Å and a narrow diameter distribution of less than or equal to about 30 Å, the material having a void volume from the mesopore-sized channels of at least about 0.1 cc/g and a surface area of at least about 500 m$^2$/g and having a number of hydroxyl groups of at least about 1.5 mmol of hydroxyl groups per gram of material, and exhibiting thermal and hydrothermal stability at temperatures up to about 500° C. Catalytic materials incorporating aluminum and other active metals, as well as a process for preparing the composition, are also disclosed.

16 Claims, 4 Drawing Sheets

STABLE SYNTHETIC MATERIAL AND METHOD FOR PREPARING SAME

CROSS-REFERENCE TO RELATED APPLICATION

The instant application is a divisional of application Ser. No. 09/024,069 filed Feb. 17, 1998, now U.S. Pat. No. 6,106,802; which in turn is a C-I-P of application Ser. No. 08/794,204, filed Jan. 31, 1997, now U.S. Pat. No. 5,840,271.

BACKGROUND OF THE INVENTION

The invention relates to a thermally and hydrothermally stable synthetic material having a high void volume attributable to tortuous mesopore-sized channels having a mean diameter between about 15 Å and about 100 Å and a narrow size distribution of less than or equal to about 30 Å, and a process for preparing same, so as to provide an excellent starting material for incorporation of active materials and the like.

Amorphous silica-aluminas are commercially used catalysts in many processes due to their acidity. The two most common methods for preparing amorphous silica-alumina are the controlled deposition of an alumina salt on a silica surface, and the co-precipitation of silica and alumina species from solution. In the first method, the silica surface is prepared from a silica gel, and alumina salt is hydrolyzed and precipitated by addition of aqueous ammonia.

The first method, controlled deposition of alumina on silica gel, leads to the generation of tetrahedrally coordinated aluminum, due to the controlled incorporation of the hydrolyzed aluminum atoms into the silica structure. In practice, however, this method is not desirable because the porosity of the silica gel collapses upon thermal treatment, for example during calcination, thereby making the aluminum atoms inaccessible to hydrocarbon molecules or other materials to be treated, thereby diminishing the practical value of such composition for commercial processes.

The second method, co-precipitation, leads undesirably to a large amount of octahedrally coordinated aluminum.

It is therefore evident that the need remains for a synthetic material wherein alumina and other active materials can be incorporated or deposited in tetrahedrally coordinated position with silica and wherein the composition maintains its porous structure without collapsing during calcination and/or other high temperature processes.

It is therefore the primary object of the present invention to provide a material on which active materials can be deposited and dispersed which material is thermally and hydrothermally stable.

It is a further object of the present invention to provide a method for preparing such a material.

Other objects and advantages of the present invention will appear hereinbelow.

SUMMARY OF THE INVENTION

In accordance with the invention, the foregoing objects and advantages are readily attained.

According to the invention, a composition of matter is provided which comprises an inorganic porous material having wall portions defining mesopore-sized channels having a mean diameter of between about 15 Å and about 100 Å and a narrow diameter distribution of less than or equal to about 30 Å, said material having a void volume from said mesopore-sized channels of at least about 0.1 cc/g and a surface area of at least about 500 m$^2$/g and having a number of hydroxyl groups of at least about 1.5 mmol of hydroxyl groups per gram of material, and exhibiting thermal and hydrothermal stability at temperatures up to about 500° C.

In further accordance with the present invention, a process is provided for preparing an inorganic porous material in accordance with the present invention, which process comprising the steps of forming a solution of a hydrolyzable inorganic compound with a non-ionic tensoactive organic molecule; inducing growth and condensation of a solid composition comprising an inorganic composition in intimate contact with said organic molecule; and extracting said organic molecule with a solvent so as to provide a porous solid composition having a porous structure and having a number of hydroxyl groups of at least about 1.5 mmol of hydroxyl groups per gram of material, wherein said material maintains said porous structure upon thermal and hydrothermal treatments at temperatures of up to about 500° C.

In accordance with the present invention, solvent extraction and calcination can be used, if desired, to control the number of hydroxyl groups present in the resulting inorganic porous material.

Further, an active material such as an active metal or non-metal, absorbent or adsorbent agents, and the like, may readily be deposited directly upon the inorganic porous material to provide a wide variety of catalysts useful in various applications in accordance with the present invention.

BRIEF DESCRIPTION OF THE DRAWINGS

A detailed description of preferred embodiments of the present invention follows, with reference to the attached drawings, wherein.

DETAILED DESCRIPTION

Figure 1:
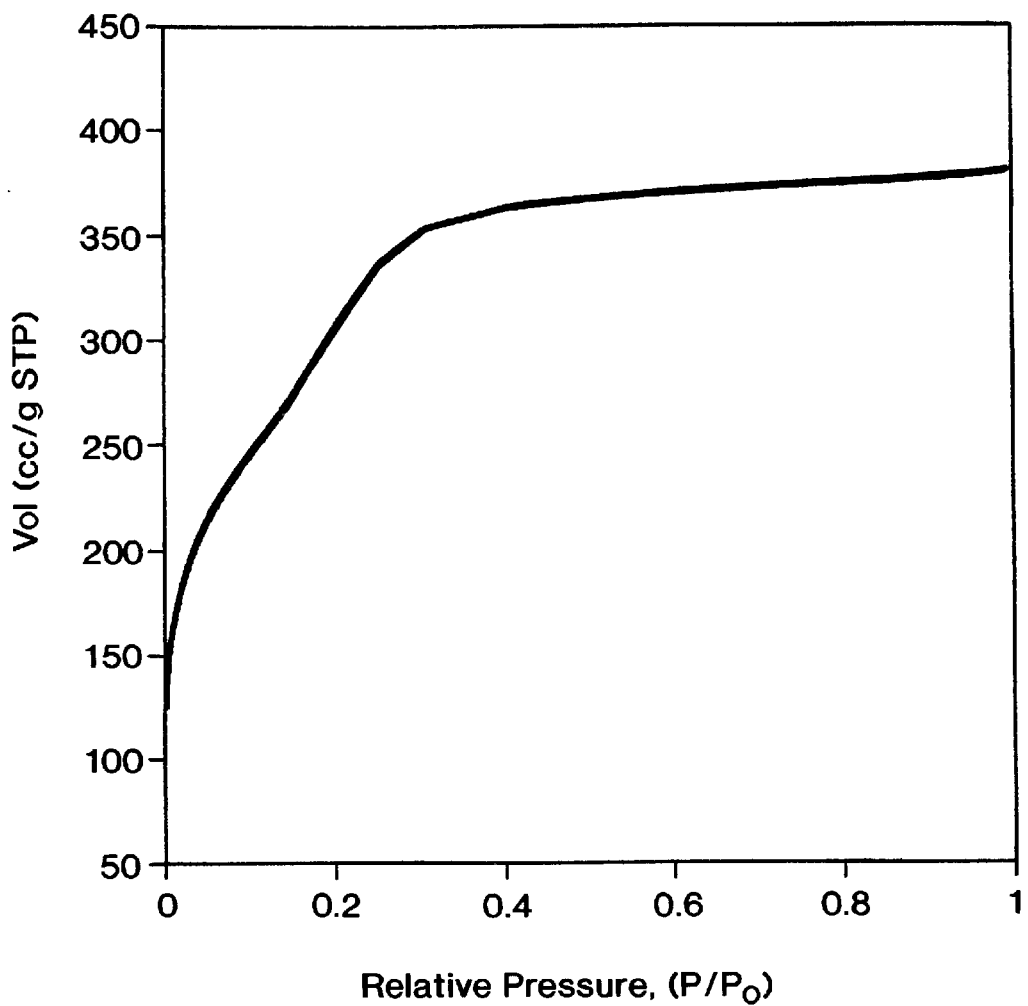
FIG. 1 is the N$_2$ adsorption isotherm for the product of Example 1.

The invention relates to a synthetic material which advantageously possesses high void volume generated by mesoporous channels with a narrow size distribution and which further exhibits enhanced stability under thermal and hydrothermal treatment conditions. This material is ideally suited, for example, as a support for catalytic components for various processes.

For metals to become effective catalytic components in their metallic state, or as oxides, sulfides or mixtures thereof, it is important to effectively disperse them on supports, to enhance their surface to volume ratio. The ability of a support to effectively disperse active catalytic components is associated to density of anchoring sites. In silica, a preferred support in many catalytic applications, the anchoring sites are surface hydroxyl groups. The highest density of hydroxyl groups in silica supports is observed in silica gels with a density of between 2 and 3 hydroxyl groups per nm$^2$. This material, however, is not thermally or hydrothermally stable, and upon these treatments the material usually collapses, rendering the active sites inaccessible to the reactant molecules. Because of this, other silica sources such as pyrogenic or precipitated silicas, are conventionally used to disperse catalytic components due to superior thermal and hydrothermal stability. The hydroxyl concentration in these materials, however, is substantially lower than in silica gels, hampering the ability of these silica forms to disperse active materials.

In accordance with the present invention, synthetic material is provided with a hydroxyl group concentration similar to that of silica gel and with the thermal and hydrothermal stability of other silica forms such as pyrogenic or precipitated silicas.

According to the invention, a synthetic material is provided having a high void volume, preferably at least about 0.1 cc/g and more preferably at least about 0.2 cc/g, wherein the void volume is attributable to or generated from tortuous channels defined in the material. The channels preferably have a mean diameter between about 15 Å and about 100 Å and a narrow size distribution less than or equal to about 30 Å. The surface area of these channels is high, preferably at least 500 m$^2$/g of material and more preferably at least about 800 m$^2$/g, and it is covered by a high concentration of hydroxyl groups, preferably at least about 1.5 mmol of hydroxyl groups per gram of material. These advantageous characteristics allow the synthetic material of the present invention to be used in treating a feedstock having a fraction of large-hydrocarbon molecules. During such treatment, larger molecules are upgraded, converted or otherwise treated in sites within the mesoporous channels. In a different process, a component of the feedstock may also be separated by selective adsorption into the mesoporous channels of the synthetic material.

The synthetic material according to the invention also advantageously exhibits enhanced stability in the presence of steam and/or high temperatures, for example up to at least about 500° C., making the material excellently suited for use in processes involving thermal and hydrothermal steps. It is believed that the enhanced stability of material of the present invention results from well structured and/relatively thick walls of the material that define the mesoporous tortuous channels.

The narrow size distribution of mesoporous channels in the synthetic material of the present invention is exhibited, for example, by a nitrogen adsorption isotherm having sharp inflection points at P/P$_0$ values of between about 0.05 and about 0.8, and a relatively flat isotherm above P/P$_0$ of 0.8, indicating mesopore pore size distribution of between about 15 Å and about 100 Å. This feature of the present invention is further exhibited by a plot of the derivative of N$_2$ adsorption volume as a function of pore diameter which shows a narrow band of pore sizes preferably centered around a pore size of less than or equal to about 40 Å (See Example 1 below, FIG. 2). In accordance with one aspect of the present invention, the material may preferably have a short range order structure, which has enhanced resistance to breakdown when subjected to thermal and hydrothermal treatments. The preferred short range order in the synthetic material of the present invention is exhibited, for example, by a high energy electron diffraction pattern (EDP) containing only diffuse halos at d-spacing larger than 20 Å. One or more halos may be exhibited. This short range order is indicative of material having structural features (believed to be the tortuous channels) that repeat themselves substantially throughout the material, but in correlations where the feature extends only a few times (up to about five times, while in the case of crystalline materials features can repeat themselves thousands, or at the very least hundreds of times). This material is referred to as a material having a repeat value of less than or equal to about 5.

The concentration of surface hydroxyl groups is exhibited by physical methods such as the signal intensity between 0 and 5 ppm on a $^1$H MAS NMR spectrum or by chemical methods such as titration with a selective reagent such as trimethylchlorosilane.

In further accordance with the invention, a process for preparing the synthetic material of the present invention is provided. Advantageously, the process serves to provide a synthetic material preferably having short range order and tortuous mesoporous channels formed therein wherein the channels are defined by walls believed to have a thickness sufficient to enhance resistance of the synthetic material to use in thermal and hydrothermal processes. This is advantageous in that conventionally prepared materials either possess very wide mesopore size distributions (between 50 Å and 1000 Å) or possess poor thermal and hydrothermal stability in same rendering the conventionally prepared materials undesirable for many processes, especially those involving treatment of feedstocks having large organic molecule fractions.

According to the invention, an inorganic porous material is prepared by forming a solution of a hydrolyzable inorganic compound with non-ionic tensoactive organic molecules. The solution is thoroughly mixed, and then treated so as to induce the formation of a solid material comprising an inorganic composition in intimate contact with the non-ionic surfactant or tensoactive organic molecules. Solids may be formed by gelation of the hydrolyzable inorganic compounds at pH values near the isoelectric point of the inorganic species in solution, and further condensation of the gel to form a solid material by aging of the gel at low temperatures, between about 0° C. and 40° C., and/or by thermal treatment at temperatures between about 40° C. and 120° C.

The solid material so obtained is then preferably separated from remaining liquid of the solution, for example by centrifugation, washed with water, and dried at room temperature.

The washed and dried solid is then treated through solvent extraction so as to extract the non-ionic surfactant from the inorganic composition so as to provide an inorganic material with a high void volume of at least about 0.1 cc/g generated by or attributable to the tortuous channels, and having a mean diameter between about 15 Å and about 100 Å and a narrow size distribution of less than or equal to about 30 Å. As set forth above, the material formed in accordance with the process of the present invention preferably has a short range order structure indicating a material which is an intermediate case between crystalline (long-range) and disordered materials.

In accordance with the invention, the conditions inducing the growth and condensation of the hydrolyzable compound are controlled so as to form chain-like polymeric inorganic species that favor attractive interactions (by hydrogen bonding and/or Van der Waals forces) with the polar groups of the non-ionic surfactant. This may suitably be carried out by providing and maintaining a pH of the solution which is equal to or within about ±2 pH numbers of the isoelectric point mean value of the inorganic species or combination of inorganic species in solution. At the isoelectric point the condensation step is relatively slow, and the hydrolyzable species tend to polymerize into linear molecules that are occasionally cross-linked. These molecular chains entangle and form additional branches. These chain-like species are pervious to the non-ionic surfactant, facilitating the establishment of attractive interactions. At synthesis conditions far from the isoelectric point, the polymerization rate is fast, leading to the formation of more highly branched clusters that are not penetrable, and cannot easily interact with the non-ionic surfactant. Furthermore, near the isoelectric point, the hydrolyzed groups of the inorganic species in solution contain for the most part hydroxyl groups, favoring attractive interactions with the electron donor groups of the non-ionic surfactant by H bonding.

The pH of the solution may be adjusted according to the invention by adding acid to the solution, preferably hydrochloric acid (HCl), although other acids may also be used.

In accordance with the invention, the hydrolyzable inorganic compound may suitably be selected from the group consisting of chlorides, alkoxides, nitrates, hydroxides, sulphates, and mixtures thereof, among others, preferably nitrates, hydroxides and mixtures thereof. Also, the inorganic species in solution can be prepared by dissolution of an oxide with an appropriate acid or base. Further, precursors to the oxides may be used, such as colloidal silica, alumina sols, suspensions of pseudo-bentonite, titania or zirconia and/or hydrosols of any oxide, among others.

The non-ionic surfactant or tensoactive organic molecules to be used according to the present invention may suitably be selected from the group consisting of ethoxylated alcohols, ethoxylated alkylphenols, amine oxides, ethoxylated amines and mixtures thereof. The non-ionic surfactant may suitably be mixed in solution with the inorganic compound so as to provide a molar ratio of ionic surfactant to inorganic species of between about 0.05 and about 20.

Any metal oxide or mixture of oxides can be prepared with the method of the present invention, as long as the appropriate pH value is selected. An indication of this value is given by the isoelectric point of the respective solid oxides or hydroxides, some of which are summarized in Table 1, and with an extensive compilation given by G. A. Parks, Chemistry Reviews, Vol. 65, pages 177 to 198, 1965.

TABLE 1

| MATERIAL | ISOELECTRIC POINT |
| --- | --- |
| Silica | 1.8 to 2.2 |
| Alumina | 8.0 to 9.2 |
| Titania | 4.7 to 6.2 |
| Magnesia | 11 to 12 |
| Iron Oxide | 5.2 to 7.4 |

The isoelectric point mean value for the materials of TABLE 1, as used herein, are set forth in TABLE 2.

TABLE 2

| MATERIAL | ISOELECTRIC POINT MEAN VALUE |
| --- | --- |
| Silica | 2.00 |
| Alumina | 8.60 |
| Titania | 5.45 |
| Magnesium | 11.50 |
| Iron Oxide | 6.30 |

In accordance with the invention, the solid porous inorganic material obtained in accordance with the invention has a high void volume, at least about 0.1 cc/g, attributable to tortuous channels with a mean diameter between about 15 Å and about 100 Å and a narrow size distribution of less than or equal to about 30 Å, and having stability for use in thermal and hydrothermal treatments and processes. The material is preferably also a short range order material as discussed above.

As set forth above, during solvent extraction, the non-ionic surfactant is extracted and removed from intimate contact with the inorganic material, thereby vacating mesopore-sized tortuous channels having the desired mean diameter between about 15 Å and about 100 Å, and distributed in a narrow size distribution no more than 30 Å wide that render accessible a high concentration of surface hydroxyl groups, which concentration can be controlled, if desired, through calcination.

Calcining is preferably carried out, if desired, at a temperature of between about 200° C. and about 800° C., for a period of at least about 1 hour. Of course, different materials may require different calcination times and temperatures for a proper control of the hydroxyl group concentration.

It should be noted that the total volume of mesopore void volume formed in the final product depends upon the size and concentration of the non-ionic surfactant in the starting solution. Further, the actual size of mesopore-sized channels depends upon the size or molecular weight of the organic molecules. Thus, the amount and size of organic molecule to be used in solution may be selected so as to provide the desired mesopore total void volume and mesoporous channel size.

The amount and size of the mesoporous-sized void volume can also be selectively controlled by adding organic water-insoluble compounds to the mixture of the inorganic species and the non-ionic surfactant. These water-insoluble compounds combine with the hydrophobic tail of the surfactant, and increase the size of the micelle around which the inorganic species condense, thus increasing the size and volume of resulting mesopore-sized channels in the material of the present invention. Suitable organic water-insoluble compounds according to the invention may be selected from the group consisting of p-xylene, trimethylbenzene, triethylbenzene, dimethyladamantane and mixtures thereof.

By adjusting the mesoporous channel size and mesopore void volume, the total surface area can be controlled, which, in return, contributes to adjust the concentration of surface hydroxyl groups per gram of material.

As is the case with many catalysts, it may be advantageous to combine the material of the present invention with a matrix material that has desirable thermal, mechanical or other properties. The material of the present invention may also be combined with other materials, such as diluents to control the amount of conversion in a given process. Examples of such materials are aluminas, silicas, silica-aluminas, magnesias, titanias, zirconias, carbons and their precursors, clays and mixtures thereof. Also, precursors to the above mentioned materials can be used, such as colloidal silica, alumina sols, suspensions of pseudo-bohemite, titania, or zirconia, and hydrosols of any above mentioned oxides, among others. These materials may be combined with the material of the present invention during preparation or in a post-synthesis process. Also, these materials may be provided in part in colloidal form so as to facilitate extrusion of desired components.

The material of the present invention is useful as a catalyst for conversion of organic compounds, especially large hydrocarbons with molecular sizes of about 15 Å or more.

It is particularly useful for catalyzing reactions that occur in the presence of acidic sites, in which the large hydrocarbon molecule is converted into products of lower molecular weight or into more valuable isomers. Examples of such reactions are involved in processes such as cracking, hydrocracking and isomerization. In such processes the material of the present invention presents various advantages over conventional catalysts. The large mesopore size and void volume allow large hydrocarbon molecules to easily access the catalytically active sites located on the material, thereby minimizing diffusional constraints. The improved diffusion through channels also allows the primary products from the transformation and or conversion of the large hydrocarbon molecule to exit the material before secondary reactions can take place, thereby retarding or even avoiding the formation of undesirable secondary products such as coke which could eventually plug the channels or deactivate catalytic sites on the material.

It may also be advantageous to incorporate into the material of the present invention minor amounts of metals as catalytic components, especially noble metals such as platinum, rhodium, rhenium, palladium or iridium, or Group VIII metals such as nickel, iron or cobalt, or Group VI metals such as chromium, molybdenum or tungsten, or mixtures thereof. Additional active materials which may suitably be deposited on the support material of the present invention include Group IVB metals such as titanium, zirconium and mixtures thereof, Group VB metals such as vanadium, niobium, tantalum and mixtures thereof, and rare earth metals individually or in mixtures. Of course, active metals such as the foregoing may suitably be incorporated through impregnation with solutions of the desired metal. These metals may be present in their metallic state, or as oxides, sulfides or mixtures thereof. These metals could for example provide the material of the present invention with desired catalytic properties for processes such as hydrotreatment, hydroisomerization, hydrocracking, hydrogenation and/or reforming, to convert large hydrocarbon molecules into more valuable products.

The material of the present invention is particularly useful when the desired application involves metals as catalytic components dispersed on silica. With the material of the present invention, surface hydroxyl groups of silica are present in high concentrations and act as anchoring sites that allow the effective dispersion of large amounts of metals as catalytic components. The opposite situation has been observed with conventional forms of silica, which have been found to be poor supports for metals precisely due to low concentration of surface hydroxyl groups. According to the present invention, active metals and the like can be dispersed over the support of the present invention to provide for metal dispersion of at least about 15%, preferably at least about 20%, and further advantageously to provide for a total metal area of at least about 0.10 $m^2/g$, preferably at least about 0.25 $m^2/g$.

The material of the present invention may also be advantageously used as a sorbent for the selective separation of one or more components in a feed. The narrow size distribution of mesopore-sized channels and the large void volume allow for separation of components in the feed by size exclusion of molecules. The walls of the material of the present invention provide for sites that can be modified through incorporation of molecules that contain specific functional groups with affinity toward specific components in the mixture, allowing their separation from the feed. Examples include the incorporation of amines to preferentially adsorb acidic components in a feed, or chelating agents that separate metal contaminations off a stream. Also, these sites on the walls of the material of the present invention can be used to incorporate compounds that can control the hydrophilicity of the environment within the pores or channels, advantageously allowing the separation of polar from non-polar components in a feed.

Although the material of the present invention is useful in the treatment of any hydrocarbon molecule, it is particularly advantageous when used for the treatment of large molecules that are too big to fit into the channels of more conventional catalysts and/or sorbents. The material of the present invention is especially suited for the treatment of high boiling point hydrocarbon fractions in crude oils such as atmospheric and vacuum gas oils, high boiling point products from processes such as catalytic cracking, thermal cracking, lube production and the like and non-distillable fractions from crude oil or from conversion processes such as residual feeds. The material of the present invention could also be utilized with feeds of non-petroleum origin.

The inorganic composition of the present invention is also ideally suited to be used as a starting material for the incorporation of active materials such as aluminum, for example in the form of alumina and the like, so as to provide an amorphous silica-alumina which is useful in many commercial processes. This material is acidic due to the electron interaction between neighboring Al and Si atoms. It is desirable to maximize the number of acid sites on such a composition, and this can be accomplished by maximizing the amount of aluminum or other active material which is tetrahedrally coordinated with the silicon and bridging oxygen atoms.

In connection with this aspect of the present invention, it has further been found that the amount of aluminum or other active material which is tetrahedrally coordinated with the silicon and bridging oxygen atoms is enhanced by providing the maximum possible number of hydroxyl groups in the walls of the starting material. This can be accomplished in accordance with the present invention, particularly by extracting the non-ionic surfactant using a solvent as set forth above, without calcination until after active metals are deposited on the material. Alternatively, the number of hydroxyl groups can be controlled or directed, if desired, through calcination after the extraction step.

An inorganic composition can be prepared in accordance with the present invention which has substantially the same amount of hydroxyl groups as silica gel, with the added advantage that the material of the present invention is both thermally and hydrothermally stable, in contrast to a silica gel composition, the porosity of which collapses when subjected to calcination. It is believed that the superior thermal and hydrothermal stability of the material of the present invention, compared to conventional silica gel forms, and despite both having substantially the same amount of surface hydroxyl groups, is the result of differences in the detailed structure of their walls. Evidence of this includes the longer relaxation times (T1) for $Q^3$ and $Q^4$ species in $^{29}Si$ solid state NMR experiments, for the material of the present invention, compared to amorphous silica gels.

Due to the additional stability of the composition of the present invention, active materials such as aluminum, for example alumina salt and the like, can be provided on the inorganic composition of the present invention, for example through controlled deposition, so as to advantageously provide a final inorganic porous material, with active material deposited thereon, which can be used as a catalyst for a wide variety of commercial processes such as those involved in oil refining, and the petrochemical and fine chemical industries.

In accordance with this embodiment of the invention, silica and aluminum may be provided so as to form a ratio of Si/Al suited to a desirable application. Generally, it is preferred that the Si/Al ratio be less than or equal to about 500. Further, the silica composition of the present invention having a high number of hydroxyl groups can be used to provide a composition including aluminum wherein at least about 60% wt. of the aluminum is tetrahedrally coordinated to the silicon and bridging oxygen atoms as desired. As discussed below, (Example 3, FIG. 3) a composition according to the present invention including tetrahedrally coordinated aluminum exhibits a nuclearmagnetic resonance spectrum having essentially a single band centered at about 50 ppm.

In preparation of the intermediate product material in accordance with the present invention, suitable solvent for use in extraction includes methanol, ethanol, propanol, water, 2-methoxy-ethanol, 2-ethoxy-ethanol and mixtures thereof, especially mixtures of an alcohol and water, and solvent extraction is preferably carried out by exposing the material to a flow of the solvent at a temperature of between ambient or room temperature and about 100° C. in a soxlet or a press filter.

As set forth above, a wide variety of active materials may be deposited upon the intermediate product porous material of the present invention, especially on silica based material, so as to provide effective and stable catalyst for a wide variety of different processes. Suitable active materials which can be deposited on the intermediate product material include active metals such as aluminum and the like as discussed above, as well as other active materials which may serve as nitrile absorbers such as those described in U.S. patent application Ser. No. 08/529,759, and $CO_2$ adsorbents such as those described in U.S. Pat. No. 5,087,597.

The following examples further demonstrate the advantageous characteristics of the inorganic composition and process for preparation of same in accordance with the present invention.

EXAMPLE 1

In this example, a porous silicate composition is provided according to the invention.

An acid solution of non-ionic surfactant was formed by mixing 17.7 g of water, 9.1 g of HCl (37% wt) and 1.1 g para-nonyl phenol ethoxylated with fifteen moles of ethylene oxide per mole of alkylphenol (C9H19—Ph—O—(CH2—CH2—O) 14-CH2—CH2—OH, where Ph is phenyl group). The solution was mixed with 2.1 g of tetraethylorthosilicate (TEOS) (98% wt) for 2 minutes at room temperature, giving rise to a clear solution with the following molar composition:

1 $SiO_2$:0.10 C9H19(EO)15:9.00 HCl:127.50 $H_2O$

This clear solution was placed in a sealed 60 ml teflon-wall reactor, where it was kept at 20° C. for 24 hours, and then heated to 60° C. for 6 more hours. After this treatment a white solid was formed. This product was separated from the liquid by filtration, and washed with water several times. The surfactant was then extracted from the product by flowing through the solid a boiling mixture of ethanol in a soxlet system for 6 hours. The final product was dried at 80° C. under reduced pressure. The total removal of the surfactant in the material was verified by infrared spectroscopy and thermogravimetric analysis.

The mesopore size distribution of the calcined material was determined from its equilibrium $N_2$ adsorption isotherm, according to ASTM Standard Practice D 4641.

Figure 2:
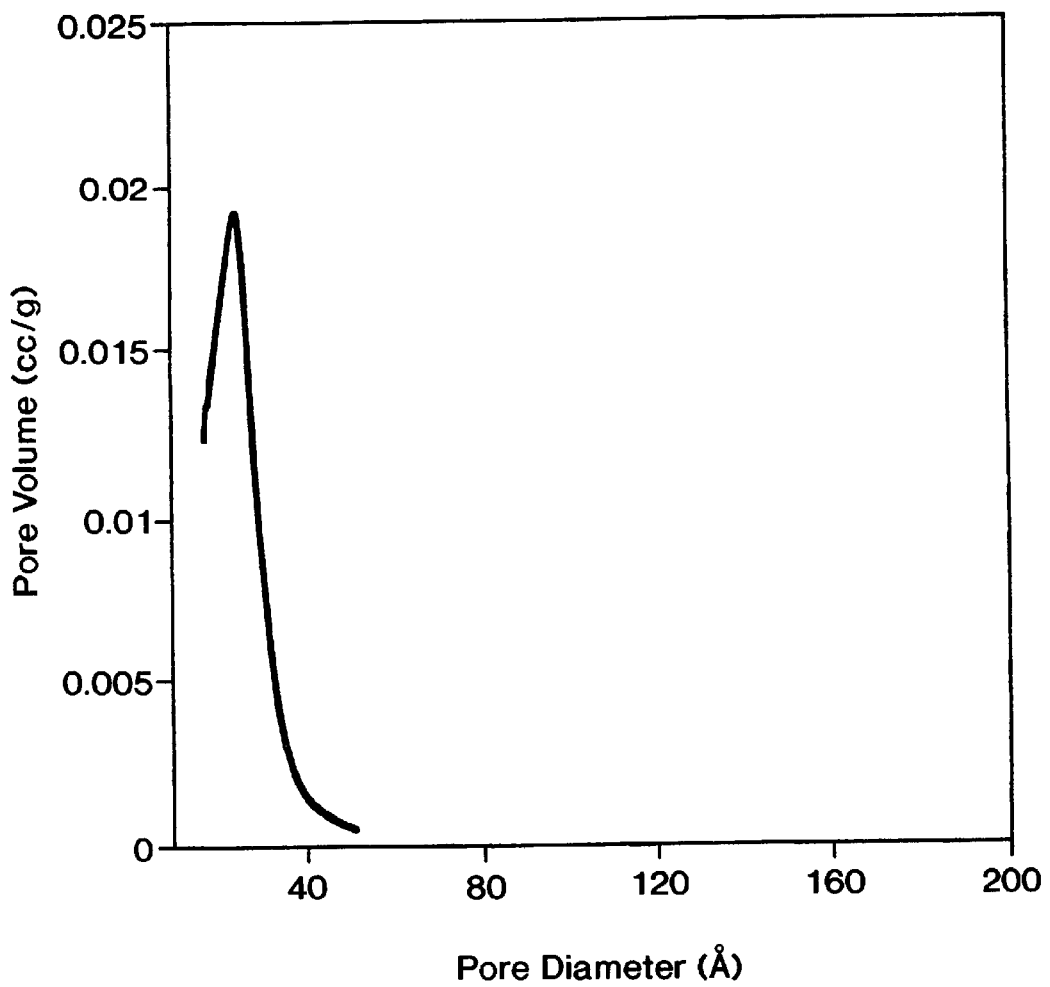
FIG. 2 is a derivative of the N$_2$ adsorption volume as a function of pore diameter for the product of Example 1, showing its size distribution of mesopores.

The $N_2$ adsorption isotherm for the calcined material is shown in FIG. 1. The isotherm has an inflection point at $P/P_0$ equal to 0.18, corresponding to the filling of pores 25 Å in average diameter. Beyond $P/P_0$ values of 0.80, the $N_2$ adsorption isotherm is essentially flat, indicating that the material does not contain pores larger than 100 Å in diameter. The well defined edge in the adsorption isotherm around its inflection point indicates that the material has a narrow size distribution of mesopores. This is better illustrated by plotting the derivative of the $N_2$ adsorption volume as a function of pore diameter, which for the calcined material is shown in FIG. 2. This figure indicates that the void volume associated to mesopores in the material can be allocated to a narrow size distribution with channels no larger than 40 Å in diameter.

The volume associated to pores 15 Å to 100 Å in diameter is equal to 0.43 cc/g, as determined from equilibrium $N_2$ adsorption capacity at relative $P/P_0$ pressures between 0.05 and 0.8.

The total surface area of the material, measured from the $N_2$ adsorption isotherm, and according to the B.E.T. model, is equal to 1055 $m^2/g$. The surface hydroxyl group concentration, measured from the signal intensity between 0 and 5 ppm on a $^1H$ MAS NMR spectrum is equal to 4.47 mmol/g, and the material is indeed a material in accordance with the present invention.

The presence in the electron diffraction pattern (EDP) of a halo 0.0334 $Å^{-1}$ in radius, indicates that the product of this example contains short range order arrays with a d-spacing (repeat distance) of 30 Å and it is indeed an embodiment of the material of the present invention.

To demonstrate the enhanced thermal stability of the material of the present invention, the product of this example was treated in a flow of air for 18 hours at 500° C. After treatment, the material maintained its original porous structure; that is, a halo in the EDP with 0.0334 Å-1 radius, indicative of short range order with a d-spacing of 30 Å, a void volume of 0.36 cc/g, as determined from the equilibrium $N_2$ adsorption capacity at a relative $P/P_0$ pressure between 0.05 and 0.8, a narrow pore size distribution between 15 Å and 35 Å, centered around 25 Å, as shown by a well defined inflection point at $P/P_0$ equal to 0.21 in the $N_2$ adsorption isotherm, and a surface area of 900 $m^2/g$, as determined from the $N_2$ adsorption isotherm, according to the B.E.T. model.

To further demonstrate the enhanced hydrothermal stability of the material of the present invention, the product of this example was treated in a flow of 100% steam for 3 hours at 823 K. After treatment, the material maintained its original properties; that is, a void volume of 0.3 cc/g, as determined from the equilibrium $N_2$ adsorption capacity at relative $P/P_0$ pressures between 0.05 and 0.8, a narrow pore size distribution between 15 Å and 25 Å, centered around 20 Å, as shown by a well defined inflection point at $P/P_0$ equal to 0.18 in the $N_2$ adsorption isotherm, a surface area of 850 $m^2/g$, as determined from the $N_2$ isotherm, according to the B.E.T. model, and a halo in the EDP with a 0.0334 $Å^{-1}$ radius, indicative of short range order with a d-spacing of 30 Å.

EXAMPLE 2

This example described the use of a source of silicate different that TEOS.

An acid solution of non-ionic surfactant was formed by mixing 21.7 g of water, 9.1 g of HCl (37 wt %), 0.53 g of para-nonyl phenol ethoxylated with fifteen moles of ethylene oxide per mole of alkylphenol ($C_9H_{19}$—Ph—O—

($CH_2$—$CH_2$—O)14—$CH_2$—$CH_2$—OH, where Ph is a phenyl group). The solution was mixed with 2.46 g of sodium silicate ($SiO_2$ 28.86 wt %, $Na_2O$ 8.94 wt %) for 2 minutes at room temperature, giving rise to a solution with the following molar composition:

1 $SiO_2$:0.06 $C_9H_9(EO)$15:9.60 HCl:132.04 $H_2O$

This solution was placed in a sealed 60 mL Teflon-wall reactor, where it was kept at 20° C. for 6 hours, and then heated to 80° C. for 6 more hours. After this treatment a white solid was formed. This product was separated from the liquid by filtration, and washed with water several times. The surfactant was then extracted from the product by flowing through the solid a warm mixture of water/alcohol in a press filter. The final product was dried at 80° C. under reduced pressure. The total removal of the surfactant in the material was verified by infrared spectroscopy and thermogravimetric analysis.

The mesopore size distribution of the extracted material was determined from its equilibrium $N_2$ adsorption isotherm, according to ASTM Standard Practice D4641. The isotherm has an inflection point at $P/P_0$ equal to 0.20, corresponding to the filling of pores 22 Å in average diameter. The volume associated to pores 15 Å to 100 Å in diameter is equal to 0.6 cc/g. The total surface area of the material, measured from the $N_2$ adsorption isotherm, and according to the B.E.T. model, is equal to 955 $m^2/g$. The surface hydroxyl group concentration, measured from the signal intensity between 0 and 5 ppm on a $^1H$ MAS NMR spectrum is equal to 4.06 mmol/g.

To demonstrate the enhanced thermal stability of the material of the present invention, the product of this example was treated in a flow of air for 18 hours at 400° C. After treatment, the material maintained its original porous structure; that is a void volume of 0.6 cc/g, as determined from the equilibrium $N_2$ adsorption capacity at a relative $P/P_0$ pressure between 0.05 and 0.8, a narrow pore size distribution between 15 Å and 35 Å, centered around 22 Å, as shown by a well defined inflection point at $P/P_0$ equal to 0.20 in the $N_2$ adsorption isotherm, and a surface area of 955 $m^2/g$, as determined from the $N_2$ adsorption isotherm, according to the B.E.T. model.

EXAMPLE 3

This example demonstrates the properties of several samples of catalyst material prepared in accordance with the present invention and including controlled deposit of active materials.

A silica based material, prepared according to the method described in Example 1, was put in contact with a solution of $Al(NO_3)_3$. The pH of the solution was adjusted to 4.5 with the addition of $NH_4OH$, and the resulting mixture was stirred for one hour to facilitate the incorporation of Al species on the surface of the material. The resulting product was filtered, washed with water and dried at 80° C. for 16 hours. The sample was then calcined in a flow of air for 16 hours at 500° C. The amount of Al to be incorporated was adjusted by varying the concentration of the $Al(NO_3)_3$ solution that was put in contact with the solid. The textural properties and Si/Al ratio of the resulting materials (identified as F1 to F3) are summarized below in Table 3. All of the samples, after calcination, have a pore volume equal to 0.4 cc/g, BET surface areas higher than 800 $m^2/g$, and narrow pore size distributions, centered around 22 Å.

Table 3 also presents the textural properties and Si/Al ratio of a conventional silica-alumina material. This material, identified as B1, was prepared by precipitation of a suspension of silica-alumina made of sodium silicate (29% wt $SiO_2$) and sodium aluminate (49% wt $Al_8O_3$), at a Si/Al molar ratio of 15. Precipitation was induced by decreasing the pH of the solution to 7 by acid addition. After washing it, the precipitate was dried at 80° C. for 16 hours and calcined at 500° C. for 4 hours. This material has a pore volume of 0.37 c/g, a BET surface area of 117 $m^2/g$, and a broad pore size distribution, centered around 126 Å.

TABLE 3

| Sample ID | Si/Al (molar) | Vp (cc/g) | dp (Å) | BET S.A. ($m^2/g$) |
|---|---|---|---|---|
| F1 | 16 | 0.41 | 21 | 863 |
| F2 | 77 | 0.41 | 21 | 863 |
| F3 | 133 | 0.39 | 21 | 840 |
| B1 | 15 | 0.37 | 126 | 117 |

In all of the samples prepared in accordance with the present invention (F1 to F3), at least 80% of the aluminum is tetrahedrally coordinated to the silica, after calcination at 500° C. in air. On the contrary, in the sample prepared using conventional silica (B1), a large fraction of the aluminum (more than 50%) is octahedrally coordinated.

Figure 3:
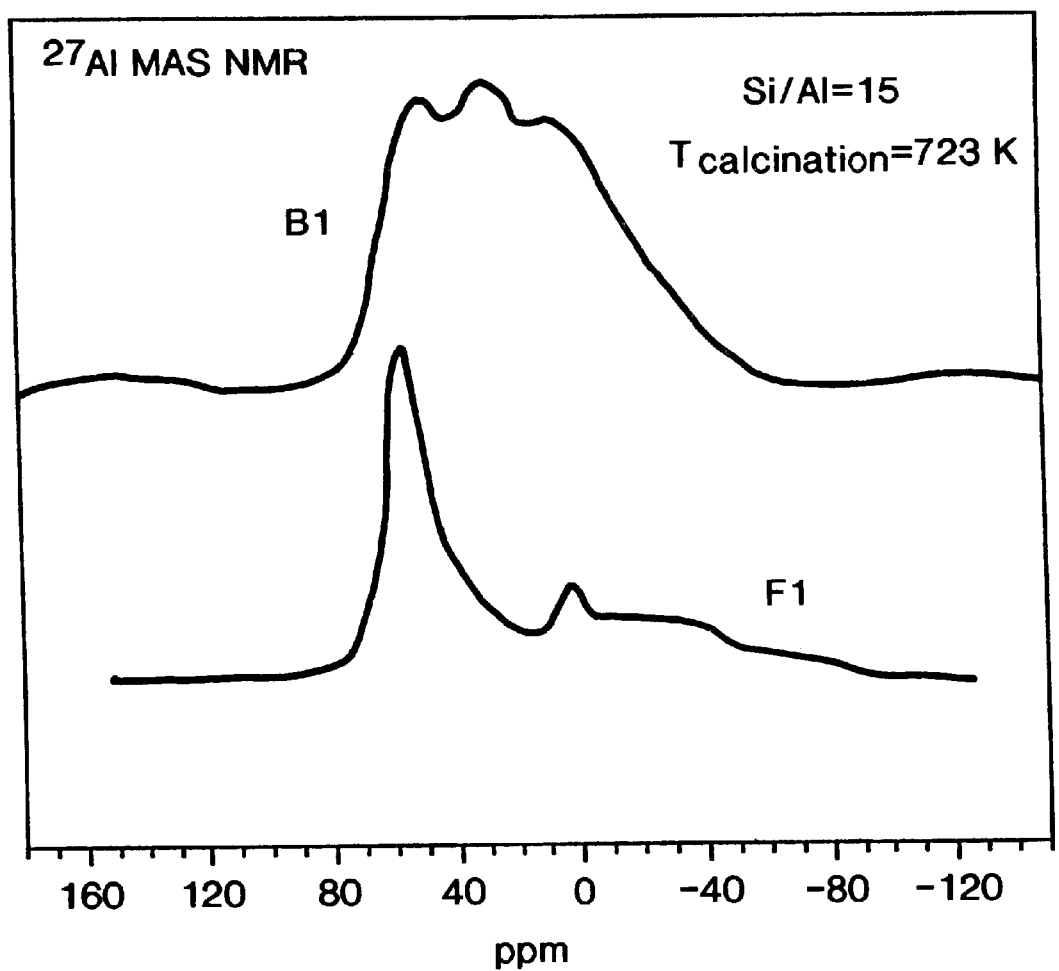
FIG. 3 shows the $^{27}$Al MAS NMR spectrum for a silica-alumina sample prepared in accordance with the present invention, and a sample prepared through co-precipitation, as described in Example 3.

The presence of tetrahedrally coordinated aluminum has been determined using 27Al Magic Angel Spinning Nuclear Magnetic Resonance ($^{27}Al$ MAS NMR). This technique is widely used for this purpose, because it generates clearly differentiated signals for tetrahedrally and octahedrally coordinated aluminum. FIG. 3, shows the results of these tests for samples F1 and B1. The large signal at approximately 50 ppm for F1 indicates that almost all of the aluminum is tetrahedrally coordinated, while the broad band ranging from −40 to 70 ppm for B1 indicates the presence of both tetrahedrally and octahedrally coordinated aluminum, with a large proportion being octahedrally coordinated. Thus, the process of the present invention clearly provides a greater concentration of aluminum in a tetrahedrally coordinated configuration, as desired. This larger fraction is believed to be responsible for the higher catalytic activity in hydrocarbon conversion, observed for the material of the present invention. As an example, the catalytic properties for hydrocarbon cracking and alcohol de-hydration reactions for the materials of the present invention (F1 to F3), are compared to those of conventional silica-alumina material (B1).

An evaluation of the catalytic properties for iso-propanol dehydration of the material of the present invention (F1 to F3), compared to those of a conventional amorphous silica-alumina are shown in Table 4. The test was carried out in a fixed bed reactor under the following conditions: temperature of 200° C., flow of iso-propanol of 1 ml/hr, and flow of carrier gas ($N_2$) of 7 ml/min. The catalytic activity of all of the tested materials, prepared according to the present invention, is substantially higher than that of the conventional silica-alumina catalyst. This is the case, even for the F3 sample, which has a total Al content almost 10 times lower than that of the conventional material.

TABLE 4

| Sample ID | iso-propanol conversion (%) |
|---|---|
| F1 | 80 |
| F2 | 82 |
| F3 | 45 |
| B1 | 8 |

The superior catalytic properties of the material of the present invention are also evident, when employing a more demanding reaction such as the cracking of n-decane. The tests were carried out in a pulse reactor under the following conditions: pulse length 25s, temperature 530° C., flow of n-decane 1.5 ml/hr, flow of carrier gas ($N_2$) 4 ml/min and mass of catalyst of 50 mg. The results of this evaluation are summarized in Table 5 below. The conversion obtained with F1 is more than 10 times higher than that of B1, despite the fact of both having similar Si/Al ratio.

TABLE 5

| Sample ID | Si/Al (molar) | n-decane conversion (%) |
|---|---|---|
| F1 | 16 | 38 |
| B1 | 15 | 3 |

Figure 4:
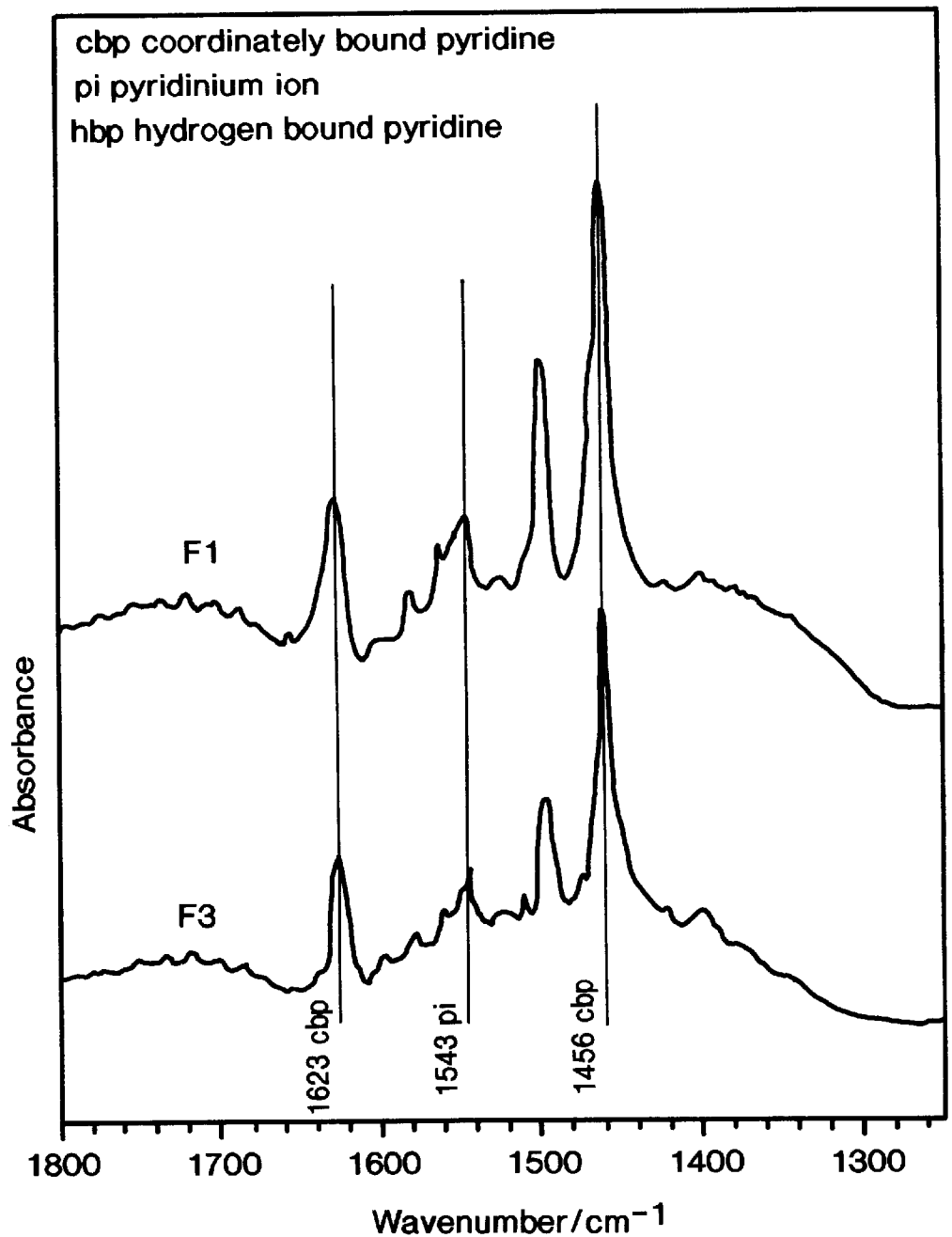
FIG. 4 shows the infrared spectrum after pyridine adsorption at room temperature and desorption for two samples of materials prepared in accordance with the present invention as described in Example 3.

The generation of acidity in the material of the present invention can also be tested using pyridine adsorption. The infrared spectrum resulting from this test for two of the samples prepared in accordance with the present invention (F1 and F3) is shown in FIG. 4. The presence of bands at 1456, 1543 and 1623 $cm^{-1}$ are clear indications that the pyridine is interacting with both Bronsted and Lewis acid sites in the materials, thereby indicating that the material is in fact highly acidic.

EXAMPLE 4

This example demonstrates the ability of the material of the present invention to disperse active catalytic phases, and in particular noble metals.

A sample of material prepared in accordance with the present invention, as described in Example 2 above, and identified as F4 was employed as a support for Pt and Pd dispersed particles. In the case of Pt, the material was impregnated with the required amount of a solution of hexachloroplatinic acid ($H_2PtCl_6$) at a pH of 3 to achieve nominal contents of 0.5 wt % and 1.0 wt %. In the case of Pd, the metal was impregnated with an aqueous solution of palladium chloride ($PdCl_2$) to achieve a nominal Pd content of 0.5 wt %. For comparison, Pt was also impregnated on a conventional silica support, identified as B2, with a total pore volume of 0.74 cc/g and a BET surface area of 137 $m^2/g$, employing the same procedure previously described, in order to achieve a nominal Pt content of 0.5 wt %.

The metal dispersions were determined from $H_2$ chemisorption experiments. The results of these tests are summarized in Table 6. For the case of Pt, the total metal area and the metal dispersion achieved when employing the material of the present invention as a support is substantially higher than the levels achieved with a conventional $SiO_2$ support. In the case of Pd, the total metal area and metal dispersion achieved when employing the material of the present invention as a support are also very high. These results indicate the ability of the material of the present invention to effectively disperse high loadings of metal particles, making it ideally suited for catalytic applications.

TABLE 7

| Support ID | Dispersed Metal | Metal loading (wt%) | Metal disp. (%) | Total metal area ($m^2/g$) |
|---|---|---|---|---|
| F4 | Pt | 0.5 | 22 | 0.27 |
| F4 | Pt | 1.0 | 22 | 0.55 |
| F4 | Pd | 1.0 | 70 | 3.10 |
| B2 | Pt | 0.5 | 2 | 0.02 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for preparation of an inorganic porous material, comprising the steps of:
   forming a solution of a hydrolyzable inorganic compound with tensoactive organic molecules comprising a non-ionic surfactant;
   inducing growth and condensation of a solid composition comprising an inorganic composition in intimate contact with said organic molecules by adjusting the solution to a pH equal to or within about ±2 pH numbers of an isoelectric point mean value of inorganic species of the inorganic compound; and
   extracting said organic molecules with a solvent so as to provide an inorganic porous solid composition having a surface area of at least about 500 $m^2/g$ and having a number of hydroxyl groups of at least about 1.5 mmol of hydroxyl groups per gram of material, and exhibiting thermal and hydrothermal stability at temperatures up to about 500° C.

2. A process according to claim 1, wherein said hydrolyzable inorganic compound is selected from the group consisting of chlorides, alkoxides, nitrates, hydroxides, sulphates and mixtures thereof.

3. A process according to claim 2, wherein said hydrolyzable inorganic compound is a silicon compound.

4. A process according to claim 1, wherein said extracting step is carried out by exposing said inorganic porous solid to a flow of solvent at a temperature of between about ambient and about 100° C.

5. A process according to claim 1, wherein said tensoactive organic molecules comprise a non-ionic surfactant selected from the group consisting of ethoxylated alcohols, ethoxylated alkylphenols, amine oxides, ethoxylated amines and mixtures thereof.

6. A process according to claim 5, wherein said non-ionic surfactant is present in a molar ratio of surfactant to inorganic species of said inorganic compound of between about 0.05 and about 20.

7. A process according to claim 1, wherein said solution is prepared using a precursor of said hydrolyzable inorganic compound, wherein said precursor is selected from the group consisting of colloidal silica, alumina sols, suspension of pseudo-bentonite, titania, zirconia, oxide hydrosols and mixtures thereof.

8. A process according to claim 1, further comprising the step of depositing an active material on said inorganic porous material, wherein said active material is selected from the group consisting of noble metals, Group VIII metals, Group VI metals and mixtures thereof.

9. A process according to claim 1, further comprising the step of depositing an active material on said inorganic porous material, wherein said active material is selected from the group consisting of platinum, palladium, rhodium, rhenium, iridium and mixtures thereof.

10. A process according to claim 8, wherein said active material is selected from the group consisting of nickel, iron, cobalt and mixtures thereof.

11. A process according to claim 8, wherein said active material is selected from the group consisting of chromium, molybdenum, tungsten and mixtures thereof.

12. A process according to claim 1, further comprising the step of depositing an active material on said inorganic porous material, wherein said active material is selected from the group consisting of titanium, zirconium and mixtures thereof.

13. A process according to claim 1, further comprising the step of depositing an active material on said inorganic porous material, wherein said active material is selected from the group consisting of vanadium, niobium, tantalum and mixtures thereof.

14. A process according to claim 1, further comprising the step of depositing an active material on said inorganic porous material, wherein said active material is selected from the group consisting of rare earth metals and mixtures thereof.

15. A process according to claim 1, further comprising the step of depositing aluminum on said inorganic porous material so as to provide a final inorganic porous material having at least about 60% wt. of said aluminum tetrahedrally coordinated with said inorganic composition.

16. A process according to claim 15, wherein said inorganic composition is silica.

* * * * *